United States Patent
Otsuka et al.

(10) Patent No.: US 11,619,178 B2
(45) Date of Patent: Apr. 4, 2023

(54) CONTROLLER FOR GAS TURBINE, CONTROL METHOD FOR GAS TURBINE, AND GAS TURBINE

(71) Applicant: Mitsubishi Power, Ltd., Kanagawa (JP)

(72) Inventors: Erina Otsuka, Tokyo (JP); Makoto Kishi, Tokyo (JP); Atsushi Kakiuchi, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 40 days.

(21) Appl. No.: 17/328,585

(22) Filed: May 24, 2021

(65) Prior Publication Data
US 2021/0381443 A1 Dec. 9, 2021

(30) Foreign Application Priority Data
Jun. 8, 2020 (JP) .............................. JP2020-099409

(51) Int. Cl.
*F02C 9/54* (2006.01)

(52) U.S. Cl.
CPC ............ *F02C 9/54* (2013.01); *F05D 2220/32* (2013.01); *F05D 2270/05* (2013.01); *F05D 2270/313* (2013.01)

(58) Field of Classification Search
CPC ................. F02C 9/54; F02C 9/28; F02C 9/18
See application file for complete search history.

(56) References Cited

U.S. PATENT DOCUMENTS

| | | | | |
|---|---|---|---|---|
| 4,998,949 A | * | 3/1991 | Cantwell | G05D 13/04 60/792 |
| 2012/0167581 A1 | * | 7/2012 | Pesce | F02C 6/18 60/773 |
| 2013/0125557 A1 | * | 5/2013 | Scipio | F02C 3/13 60/773 |
| 2014/0260177 A1 | * | 9/2014 | Reed | F02C 9/22 60/39.24 |
| 2015/0040573 A1 | * | 2/2015 | Ferreira-Providakis | F02C 7/228 60/776 |

(Continued)

FOREIGN PATENT DOCUMENTS

JP 2013-209917 10/2013
WO 2017/051766 3/2017

*Primary Examiner* — Katheryn A Malatek
(74) *Attorney, Agent, or Firm* — Wenderoth, Lind & Ponack, L.L.P.

(57) ABSTRACT

A gas turbine includes a compressor configured to compress air; a combustor configured to mix and combust fuel and compressed air compressed by the compressor; a turbine configured to obtain rotational power using combustion gas generated by the combustor; an inlet guide vane disposed at an intake of the compressor to adjust a flow rate of air flowing into the compressor; a bleed line configured to return a part of the compressed air pressurized in the compressor to the intake of the compressor; and an on-off valve disposed in the bleed line. When the output of the gas turbine increases, a preset maximum value limit of the inlet guide vane is corrected based on a valve opening degree command value of the on-off valve and a compressor intake temperature such that the gas turbine achieves a predetermined performance.

8 Claims, 10 Drawing Sheets

(56) References Cited

U.S. PATENT DOCUMENTS

| | | | |
|---|---|---|---|
| 2015/0101341 A1* | 4/2015 | Dusing | F23C 6/042 |
| | | | 60/774 |
| 2016/0273404 A1* | 9/2016 | Ekanayake | F02C 6/18 |
| 2016/0333731 A1* | 11/2016 | Zhang | F02C 7/228 |
| 2017/0175567 A1* | 6/2017 | Talukdar | G05B 13/04 |
| 2017/0342901 A1* | 11/2017 | Scipio | F02C 7/08 |
| 2017/0342902 A1* | 11/2017 | Scipio | F02C 9/18 |
| 2017/0342903 A1* | 11/2017 | Scipio | F02C 9/18 |
| 2018/0100442 A1* | 4/2018 | Mathai | F04D 27/0223 |
| 2018/0209341 A1 | 7/2018 | Nakahara et al. | |

* cited by examiner

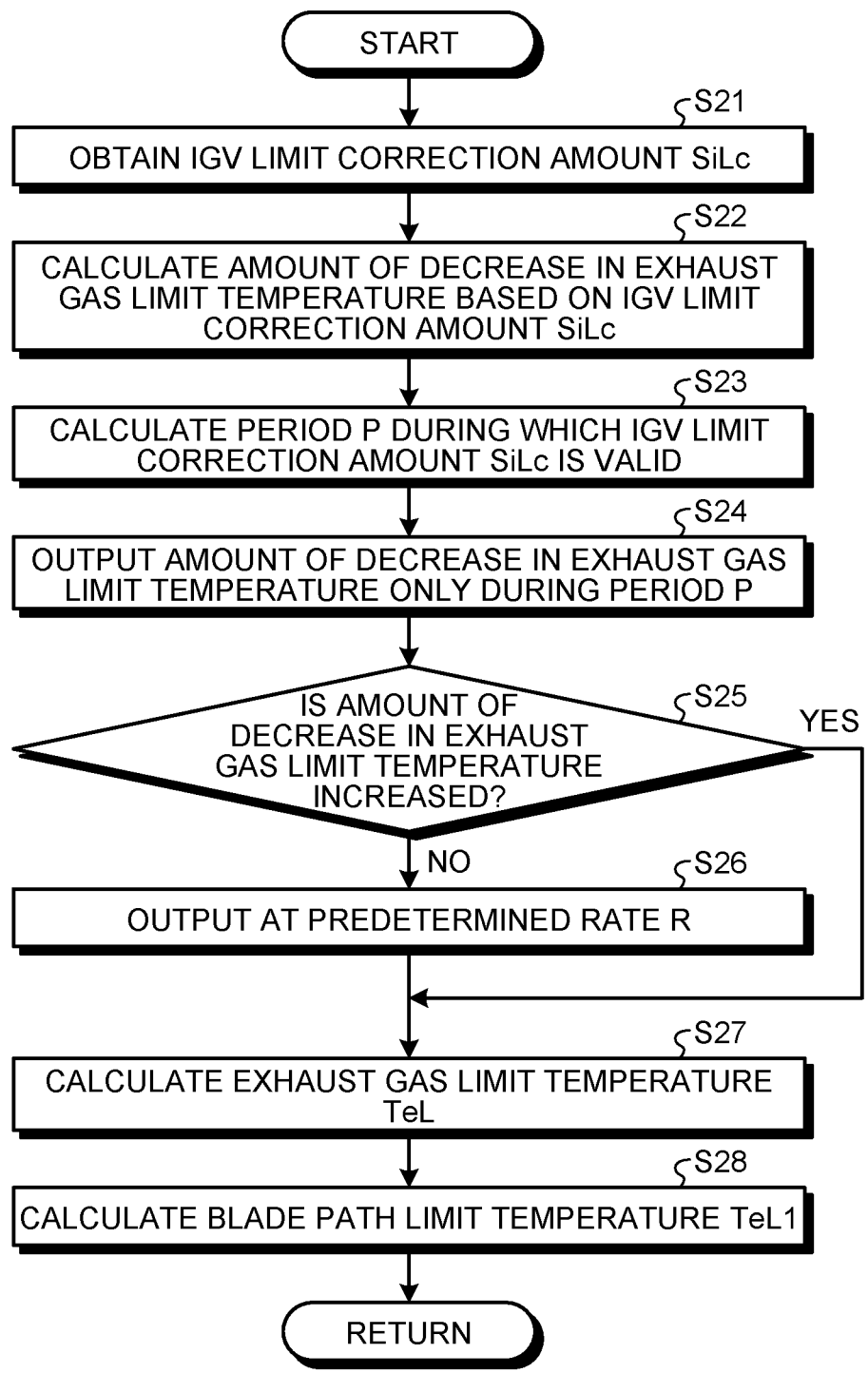

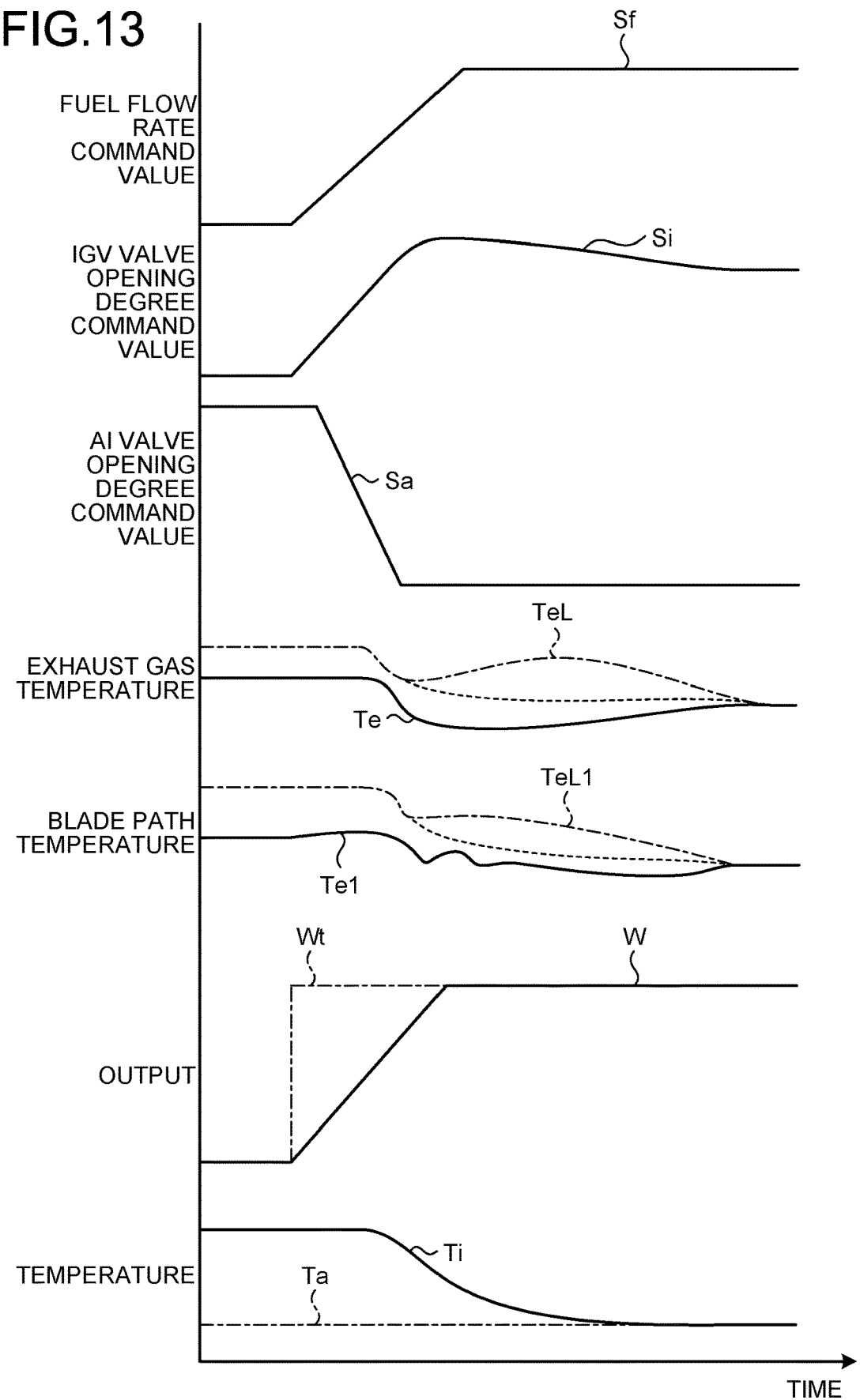

CONTROLLER FOR GAS TURBINE, CONTROL METHOD FOR GAS TURBINE, AND GAS TURBINE

CROSS-REFERENCE TO RELATED APPLICATIONS

The present application claims priority to and incorporates by reference the entire contents of Japanese Patent Application No. 2020-099409 filed in Japan on Jun. 8, 2020.

FIELD

The present disclosure relates to a controller for a gas turbine including a compressor, a combustor, and a turbine, a control method for a gas turbine, and a gas turbine including the controller for a gas turbine.

BACKGROUND

A gas turbine includes a compressor, a combustor, and a turbine. The compressor compresses the air taken in from an air intake to obtain high-temperature, high-pressure compressed air. The combustor generates high-temperature, high-pressure combustion gas by supplying fuel to the compressed air and combusting the fuel. The combustion gas drives the turbine, which in turn drives a coaxially connected generator.

The operation of the gas turbine is controlled to follow the power demand (output target value). At the same time, the operation of the gas turbine, which is exposed to high combustion temperatures in a turbine intake and an exhaust air duct, is controlled so that the temperature of the exhaust gas does not exceed the limit temperature to prevent damage. To this end, the controller controls the fuel flow rate to maintain the output target value and controls the fuel-air ratio to obtain intended temperatures, that is, adjusts the air flow rate. The controller adjusts the opening degree of a fuel flow rate regulating valve in response to a fuel flow rate command signal. The controller also adjusts the opening degree of an inlet guide vane (IGV) in response to an air flow rate command signal.

When a gas turbine operates in a low ambient temperature environment, the air flowing through the IGV may drop below the freezing point, causing the moisture in the air to freeze. For this reason, a gas turbine has an anti-icing function to increase the temperature of air flowing into the compressor. To prevent icing at the air intake, the anti-icing function guides a part of the high-temperature pressurized air generated in the compressor to the air intake through an air bleed path. Maintaining the turbine intake temperature by the anti-icing function can also suppress occurrence of combustion vibration and improve the exhaust gas properties.

However, breeding a part of the pressurized air generated in the compressor during the anti-icing operation reduces the pressurized air used for the combustion in the combustor. This increases the exhaust gas temperature. The increased exhaust gas temperature may reach the limit temperature, making it difficult for the controller to increase the output according to a specified load (output) change rate in governor control. To limit the temperature, the anti-icing function is fully performed in a low-load region (e.g., the load is 0 to 70%) in which the temperature is low, whereas the anti-icing function is disabled in a high-load region (e.g., the load is 80 to 100%) in which the temperature is high. Japanese Patent Application Laid-open No. 2013-209917 and WO 2017/051766 describe such techniques.

As described above, the controller controls the exhaust gas temperature by increasing the IGV opening degree to increase the air flow rate so that the exhaust gas temperature does not reach the limit temperature. However, an opening degree upper limit value is set for the IGV opening degree. That is, if an increase in the IGV opening degree increases the air flow rate more than necessary, the workload of the compressor increases, lowering the power generation efficiency. As such, the IGV opening degree is limited by the opening degree upper limit value in the high-load region, causing the exhaust gas temperature to remain high near the limit temperature. With the conventional technique, increase in output is suspended until the compressor intake temperature naturally decreases to the atmospheric temperature and it may therefore be difficult to increase the output at the specified load change rate.

In response to the above issue, it is an objective of the present disclosure to provide a controller for a gas turbine, a control method for a gas turbine, and a gas turbine that improve the power generation efficiency by shortening the time required for the output to increase to the rated output.

Solution to Problem

A controller according to an aspect of the present invention is for a gas turbine that includes a compressor configured to compress air; a combustor configured to mix and combust fuel and compressed air compressed by the compressor; a turbine configured to obtain rotational power using combustion gas generated by the combustor; an inlet guide vane disposed at an intake of the compressor to adjust a flow rate of air flowing into the compressor; a bleed line configured to return a part of the compressed air pressurized in the compressor to the intake of the compressor; and an on-off valve disposed in the bleed line. The controller is configured to, when an output of the gas turbine increases, correct a preset maximum value limit of the inlet guide vane based on a valve opening degree command value of the on-off valve and a compressor intake temperature such that the gas turbine achieves a predetermined performance.

A control method according to another aspect of the present invention is for a gas turbine that includes a compressor configured to compress air; a combustor configured to mix and combust fuel and compressed air compressed by the compressor; a turbine configured to obtain rotational power using combustion gas generated by the combustor; an inlet guide vane disposed at an intake of the compressor to adjust a flow rate of air flowing into the compressor; a bleed line configured to return a part of the compressed air pressurized in the compressor to the intake of the compressor; and an on-off valve disposed in the bleed line. The method includes correcting, when an output of the gas turbine increases, a preset maximum value limit of the inlet guide vane based on a valve opening degree command value of the on-off valve and a compressor intake temperature such that the gas turbine achieves a predetermined performance.

A gas turbine according to still another aspect of the present invention includes a compressor configured to compress air; a combustor configured to mix and combust fuel and compressed air compressed by the compressor; a turbine configured to obtain rotational power using combustion gas generated by the combustor; an inlet guide vane disposed at an intake of the compressor to adjust a flow rate of air flowing into the compressor; a bleed line configured to return a part of the compressed air pressurized in the compressor to the intake of the compressor; an on-off valve disposed in the bleed line; and a controller configured to, when an output of the gas turbine increases, correct a preset maximum value limit of the inlet guide vane based on a valve opening degree command value of the on-off valve and a compressor intake temperature such that the gas turbine achieves a predetermined performance.

Advantageous Effects of Invention

The controller for a gas turbine, the control method for a gas turbine, and the gas turbine of the present disclosure improve the power generation efficiency by shortening the time required for the output to increase to the rated output.

BRIEF DESCRIPTION OF DRAWINGS

FIG. 12 is a flowchart of the process of correcting the exhaust gas and blade path limit temperatures performed by the controller for a gas turbine of the second embodiment.

FIG. 13 is a graph illustrating fluctuations of pieces of data during the process of correcting the exhaust gas and blade path limit temperatures performed by the controller for a gas turbine of the second embodiment.

DESCRIPTION OF EMBODIMENTS

Preferred embodiments of the present disclosure are described in detail below with reference to the drawings. The present disclosure is not limited by these embodiments and includes combinations of the embodiments when a plurality of embodiments are provided. The components of the following embodiments include those that can be easily contemplated by those skilled in the art or those that are substantially the same, or equivalent.

First Embodiment

Gas Turbine

Figure 1:
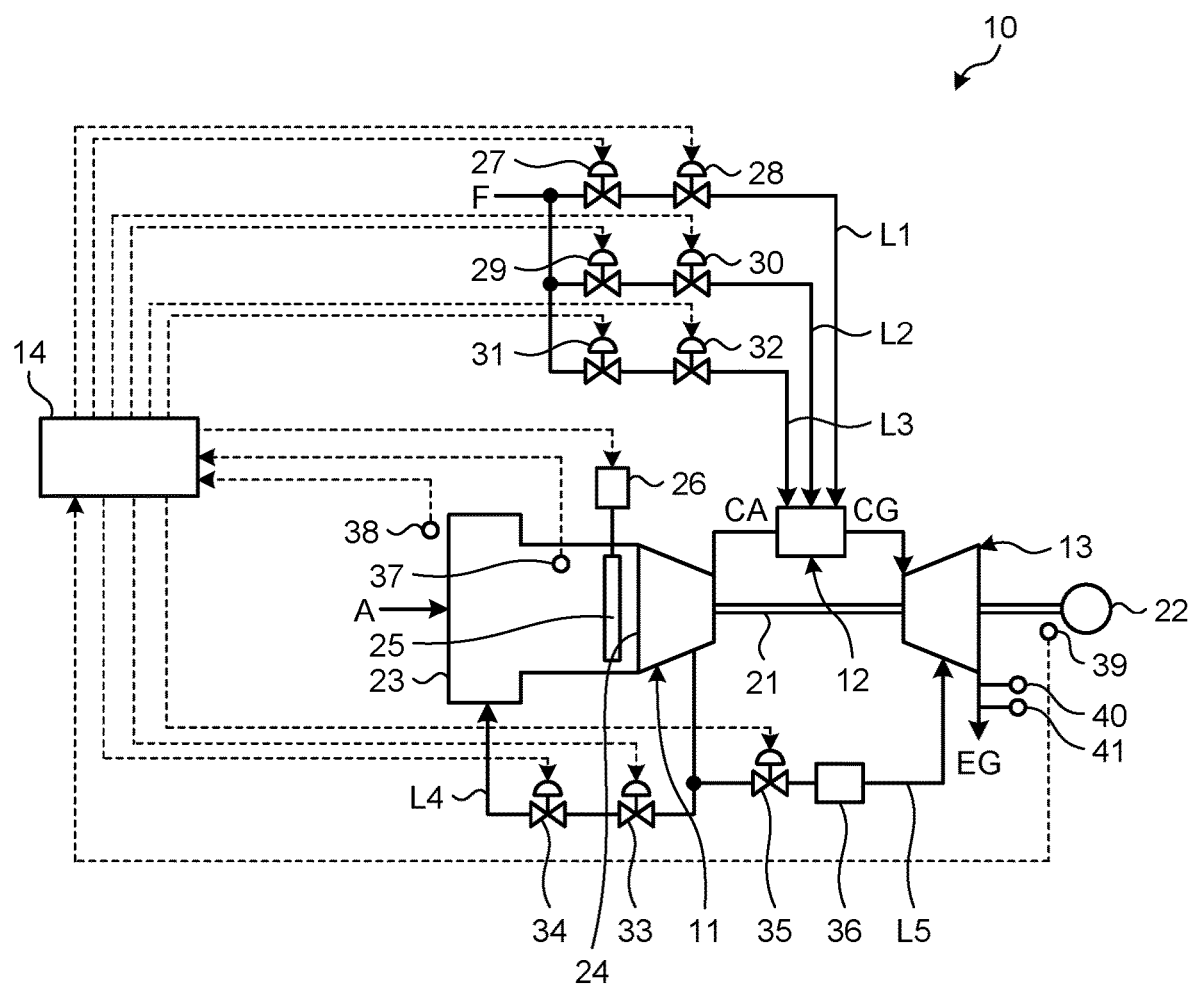
FIG. 1 is a schematic view illustrating the configuration of a gas turbine of a first embodiment.

FIG. 1 is a schematic view illustrating the configuration of a gas turbine of a first embodiment.

As illustrated in FIG. 1, a gas turbine 10 of the first embodiment includes a compressor 11, a combustor 12, a turbine 13, and a controller 14.

The compressor 11 and the turbine 13 are coupled together by a rotation shaft 21 so as to integrally rotate. The rotation shaft 21 is coupled to a generator 22. A duct 23 is coupled to the compressor 11. The compressor 11 has an air intake 24 for taking in air A at the side where the duct 23 is located. The compressor 11 also has an inlet guide vane (IGV) 25 in the casing chamber. The inlet guide vane 25 is driven by an IGV drive portion 26 and capable of adjusting the flow rate of air taken into the compressor 11. Although not illustrated, the compressor 11 includes a plurality of compressor vanes and compressor blades in the casing chamber. The compressor 11 takes in the air A from the duct 23 through the air intake 24. The compressor 11 compresses the intake air A with the compressor vanes and rotating compressor blades.

High-temperature, high-pressure compressed air CA compressed by the compressor 11 is supplied to the combustor 12. The combustor 12 generates combustion gas CG by supplying fuel F to the compressed air CA and combusting the fuel F. The combustor 12 is connected with a main fuel supply line L1, a pilot fuel supply line L2, and a top hat fuel supply line L3. The main fuel supply line L1 includes a pressure regulating valve 27 and a flow rate regulating valve 28, which are arranged in series. The pilot fuel supply line L2 includes a pressure regulating valve 29 and a flow rate regulating valve 30, which are arranged in series. The top hat fuel supply line L3 includes a pressure regulating valve 31 and a flow rate regulating valve 32, which are arranged in series. Adjusting the opening degrees of the flow rate regulating valves 28, 30, and 32 adjusts the ratio of the fuel supplied to the combustor 12 from the main fuel supply line L1, the pilot fuel supply line L2, and the top hat fuel supply line L3.

The combustor 12 supplies the combustion gas CG to the turbine 13. The supplied combustion gas CG drives the turbine to rotate. Although not illustrated, the turbine 13 includes a plurality of turbine vanes and turbine blades in the casing chamber. The combustion gas CG passing through the turbine vanes and the turbine blades in the turbine 13 rotates the rotation shaft 21 for compression. The rotational force transmitted from the turbine 13 via the rotation shaft 21 drives the generator 22 and generates power. The turbine 13 discharges exhaust gas EG after being driven.

The compressor 11 also includes a bleed line L4 and a cooling line L5. One end of the bleed line L4 is connected to the casing chamber of the compressor 11, while the other end is coupled to the duct 23. The bleed line L4 bleeds a part of the compressed air CA pressurized in the compressor 11 and returns it to the duct 23 on the upstream side of the compressor 11. The bleed line L4 includes an anti-icing (AI) supply valve 33 and an anti-icing (AI) temperature regulating valve 34, which are arranged in series. The bleed line L4, the AI supply valve 33, and the AI temperature regulating valve 34 constitute an anti-icing device. The AI supply valve 33 is a shutoff valve for shutting off the flow of the compressed air CA returning from the compressor 11 to the duct 23 through the bleed line L4. The AI temperature regulating valve 34 is a flow rate regulating valve for adjusting the flow rate of the compressed air CA returning from the compressor 11 to the duct 23 through the bleed line L4.

One end of the cooling line L5 is coupled to a section of the bleed line L4 between the AI supply valve 33 and the casing chamber, while the other end is coupled to the turbine 13. The cooling line L5 cools the turbine vanes and other parts of the turbine 13 by supplying a part of the compressed air CA pressurized in the compressor 11 to the turbine 13. The cooling line L5 includes a flow rate regulating valve 35 and a TCA cooler 36, which are arranged in series.

The compressor 11 includes a temperature sensor 37 placed in the duct 23. The temperature sensor 37 detects the temperature of mixed air (hereinafter, referred to as air A) of the air A flowing into the duct 23 from the outside and the compressed air CA returning from the compressor 11 via the bleed line L4. The temperature sensor 37 outputs the detected temperature of the air A as a compressor intake temperature Ti. The compressor 11 has a temperature sensor 38 placed outside the duct 23. The temperature sensor 38 detects the temperature of the outside air (atmosphere) and outputs it as an atmospheric temperature Ta. The generator 22 has a generator output detector 39. The generator output detector 39 detects the load of the gas turbine 10 and outputs the detected value as a load value. The turbine 13 includes temperature sensors 40 and 41 placed in the exhaust gas line. The temperature sensor 40 measures the temperature of the exhaust gas that has passed through the last stage blade provided on the downstream side in the flow direction of the exhaust gas EG of the turbine 13 (blade path temperature). The temperature sensor 41 is provided on the downstream side of the temperature sensor 40 and measures the temperature of the exhaust gas EG.

The controller 14 can drive and control the IGV drive portion 26, the pressure regulating valves 27, 29, and 31, the flow rate regulating valves 28, 30, and 32, the AI supply valve 33, the AI temperature regulating valve 34, and the flow rate regulating valve 35. That is, the controller 14 can adjust the opening degrees of the inlet guide vane 25, the pressure regulating valves 27, 29, and 31, the flow rate regulating valves 28, 30, and 32, the AI supply valve 33, the AI temperature regulating valve 34, and the flow rate regulating valve 35. The detection results of the temperature sensors 37, 38, 40, and 41 and the generator output detector 39 are input to the controller 14.

The controller 14 controls the opening degrees of the pressure regulating valves 27, 29, and 31 and the flow rate regulating valves 28, 30, and 32 and also controls the opening degree of the inlet guide vane 25 with the IGV drive portion 26 such that an output W detected by the generator output detector 39 reaches a target output Wt. At this time, the controller 14 controls the opening degree of the inlet guide vane 25 to maintain a blade path temperature Tel and an exhaust gas temperature Te detected by the temperature sensors 40 and 41 at or below a blade path limit temperature TeL1 and an exhaust gas limit temperature TeL, which are preset.

The gas turbine 10 also has the anti-icing device. The controller 14 controls the opening degrees of the AI temperature regulating valve 34 and the flow rate regulating valve 35 based on the compressor intake temperature Ti of the air A taken into the compressor 11 and the atmospheric temperature Ta detected by the temperature sensors 37 and 38. At this time, in the low-load region (e.g., when the load is 0 to 70%) in which the temperature is low, the controller 14 fully opens the AI temperature regulating valve 34 and the flow rate regulating valve 35. In the high-load region (e.g., when the load is 80 to 100%) in which the temperature is high, the controller 14 reduces or fully closes the opening degree of the AI temperature regulating valve 34.

The controller 14 controls the blade path temperature Tel and the exhaust gas temperature Te by adjusting the opening degree of the inlet guide vane 25 so that the blade path temperature Tel and the exhaust gas temperature Te are maintained at or below the blade path limit temperature TeL1 and the exhaust gas limit temperature TeL. However, when a larger opening degree of the inlet guide vane 25 increases the air flow rate more than necessary, the workload of the compressor 11 increases, lowering the power generation efficiency. For this reason, an IGV maximum value limit SiL is set to limit the maximum opening degree of the inlet guide vane 25. Consequently, the opening degree of the inlet guide vane 25 cannot be greater than the IGV maximum value limit SiL in the high-load region, causing the blade path temperature Tel and the exhaust gas temperature Te to remain high.

In this respect, the controller for a gas turbine of the first embodiment temporarily corrects and increases the IGV maximum value limit SiL in the high-load region of the gas turbine 10 to increase the opening degree of the inlet guide vane 25 and thus the air flow rate, so that the blade path temperature Tel and the exhaust gas temperature Te are less likely to remain high.

Figure 2:
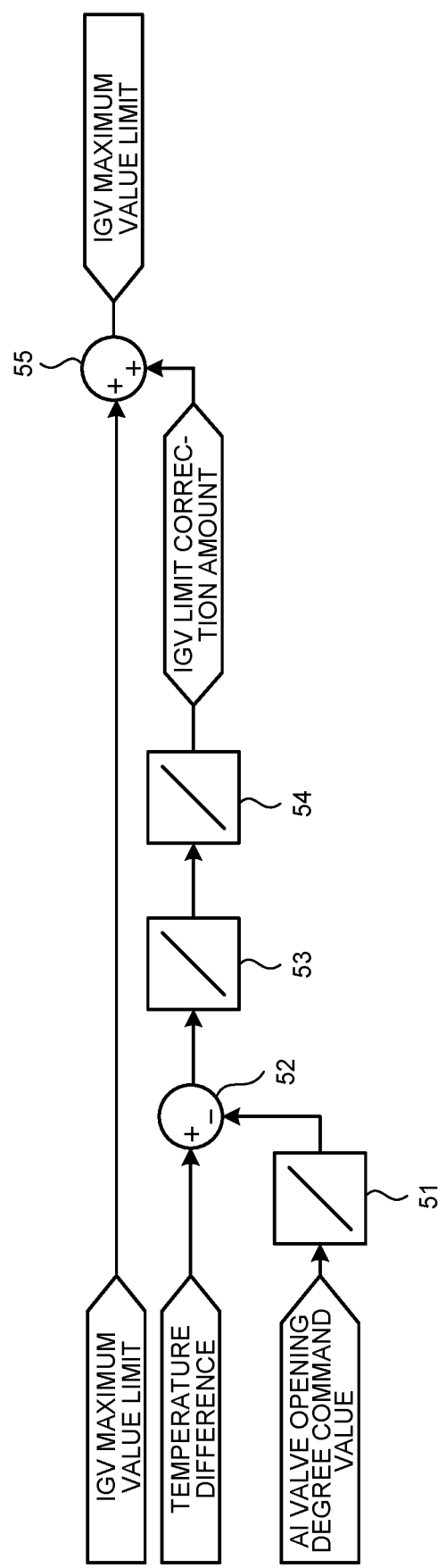
FIG. 2 is a schematic view illustrating the flow of the process of correcting the IGV maximum value limit performed by a controller for a gas turbine of the first embodiment.
Figure 3:
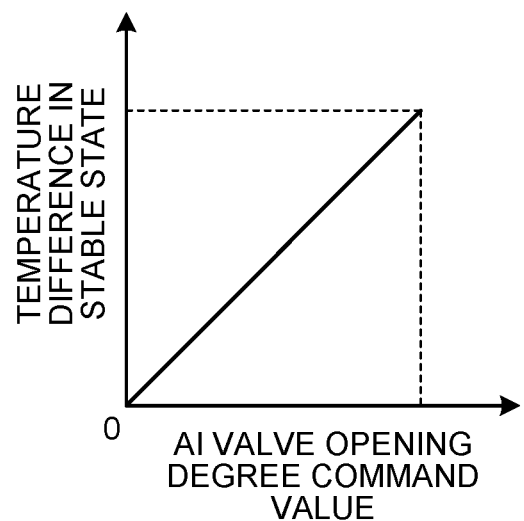
FIG. 3 is a graph illustrating the temperature difference in a steady state with respect to the AI valve opening degree command value.
Figure 4:
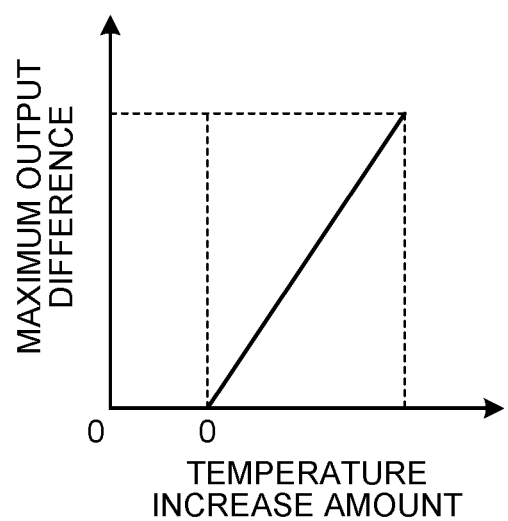
FIG. 4 is a graph illustrating the maximum output difference with respect to the temperature increase amount.
Figure 5:
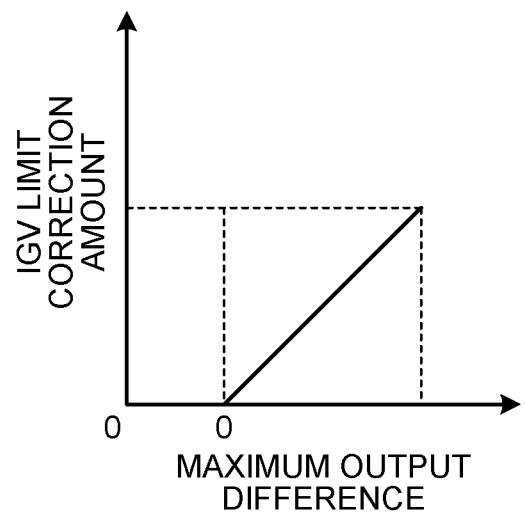
FIG. 5 is a graph illustrating the IGV limit correction amount with respect to the maximum output difference.
Figure 6:
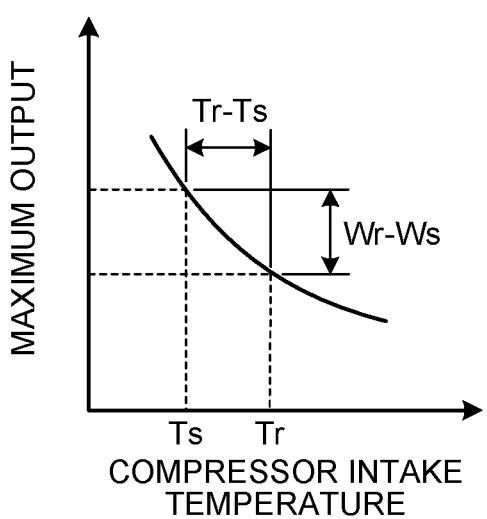
FIG. 6 is a graph illustrating the maximum output with respect to the compressor intake temperature.

FIG. 2 is a schematic view illustrating the flow of the process of correcting the IGV maximum value limit performed by the controller for a gas turbine of the first embodiment. FIG. 3 is a graph illustrating the temperature difference in a steady state with respect to the AI valve opening degree command value. FIG. 4 is a graph illustrating the maximum output difference with respect to the temperature increase amount. FIG. 5 is a graph illustrating the IGV limit correction amount with respect to the maximum output difference. FIG. 6 is a graph illustrating the maximum output with respect to the compressor intake temperature.

Referring to FIGS. 1 and 2, in the first embodiment, when the output of the gas turbine 10 increases (in the high-load region), the controller 14 corrects the IGV maximum value limit SiL of the inlet guide vane 25 based on an AI valve opening degree command value Sa of the AI temperature regulating valve (on-off valve) 34 and the compressor intake temperature Ti such that the gas turbine 10 achieves a predetermined performance. More specifically, the IGV maximum value limit SiL is set based on the power generation efficiency of the gas turbine 10 and the like. A correlation table 51 is used to calculate a temperature difference $T(i-a)s$ in a steady state between the compressor intake temperature Ti and the atmospheric temperature Ta according to the AI valve opening degree command value Sa of the AI temperature regulating valve 34. In other words, as illustrated in FIG. 3, the correlation table 51 is an increasing function that takes the AI valve opening degree command value Sa of the AI temperature regulating valve 34 as input and produces the temperature difference $T(i-a)s$ in a steady state between the compressor intake temperature Ti and the atmospheric temperature Ta as output.

Referring to FIGS. 1 and 2, a computing unit 52 calculates a temperature difference $T(i-a)r - T(i-a)s$ between a temperature difference $T(i-a)r$ between the current compressor intake temperature Ti and the atmospheric temperature Ta and the temperature difference $T(i-a)s$ in a steady state between the compressor intake temperature Ti and the atmospheric temperature Ta. A correlation table 53 is used to calculate a maximum output difference Ws−Wr between a current maximum output Wr and a maximum output Ws in a steady state of the gas turbine 10 based on the temperature difference $T(i-a)r - T(i-a)s$. That is, as illustrated in FIG. 4, the correlation table 53 is an increasing function that takes the temperature difference (temperature increase amount) $T(i-a)r-T(i-a)s$ as input and produces the maximum output difference $Ws-Wr$ as output. The temperature difference $T(i-a)r-T(i-a)s$ is a temperature increase amount, and the maximum output difference $Ws-Wr$ is output when the difference is greater than 0, that is, only when the current temperature difference $T(i-a)r$ is greater than the temperature difference $T(i-a)s$ in a steady state.

As illustrated in FIG. 6, the maximum output W of the gas turbine 10 tends to decrease as the compressor intake temperature Ti increases. Also, a current compressor intake temperature Tir tends to be higher than a compressor intake temperature Tis in a steady state, and the current maximum output Wr tends to be lower than the maximum output Ws in a steady state. The increasing function of the correlation table 53 is derived from such a relation between the compressor intake temperature Ti and the maximum output W of the gas turbine 10.

Referring to FIGS. 1 and 2, a correlation table 54 is used to calculate an IGV limit correction amount SiLc based on the maximum output difference $Ws-Wr$. That is, as illustrated in FIG. 5, the correlation table 54 is an increasing function that takes the maximum output difference $Ws-Wr$ as input and produces the IGV limit correction amount SiLc as output. Here, the IGV limit correction amount SiLc is output only when the maximum output difference $Ws-Wr$ is larger than 0, that is, when the current maximum output Wr is higher than the maximum output Ws in a steady state. Referring to FIGS. 1 and 2, a computing unit 55 corrects the IGV maximum value limit SiL by adding the IGV limit correction amount SiLc to the IGV maximum value limit SiL of the inlet guide vane 25.

When the controller 14 outputs an IGV valve opening degree command value Si to the inlet guide vane 25 or outputs the AI valve opening degree command value Sa to the AI temperature regulating valve 34, a temperature transfer lag occurs. In the correlation table 51, the temperature difference $T(i-a)s$ between the compressor intake temperature Ti and the atmospheric temperature Ta in a steady state is the temperature difference calculated using the compressor intake temperature Ti measured when thermal equilibrium has been reached and the temperature is constant and does not vary with time. In other words, the temperature difference $T(i-a)s$ in a steady state is calculated based on the design data.

Figure 7:
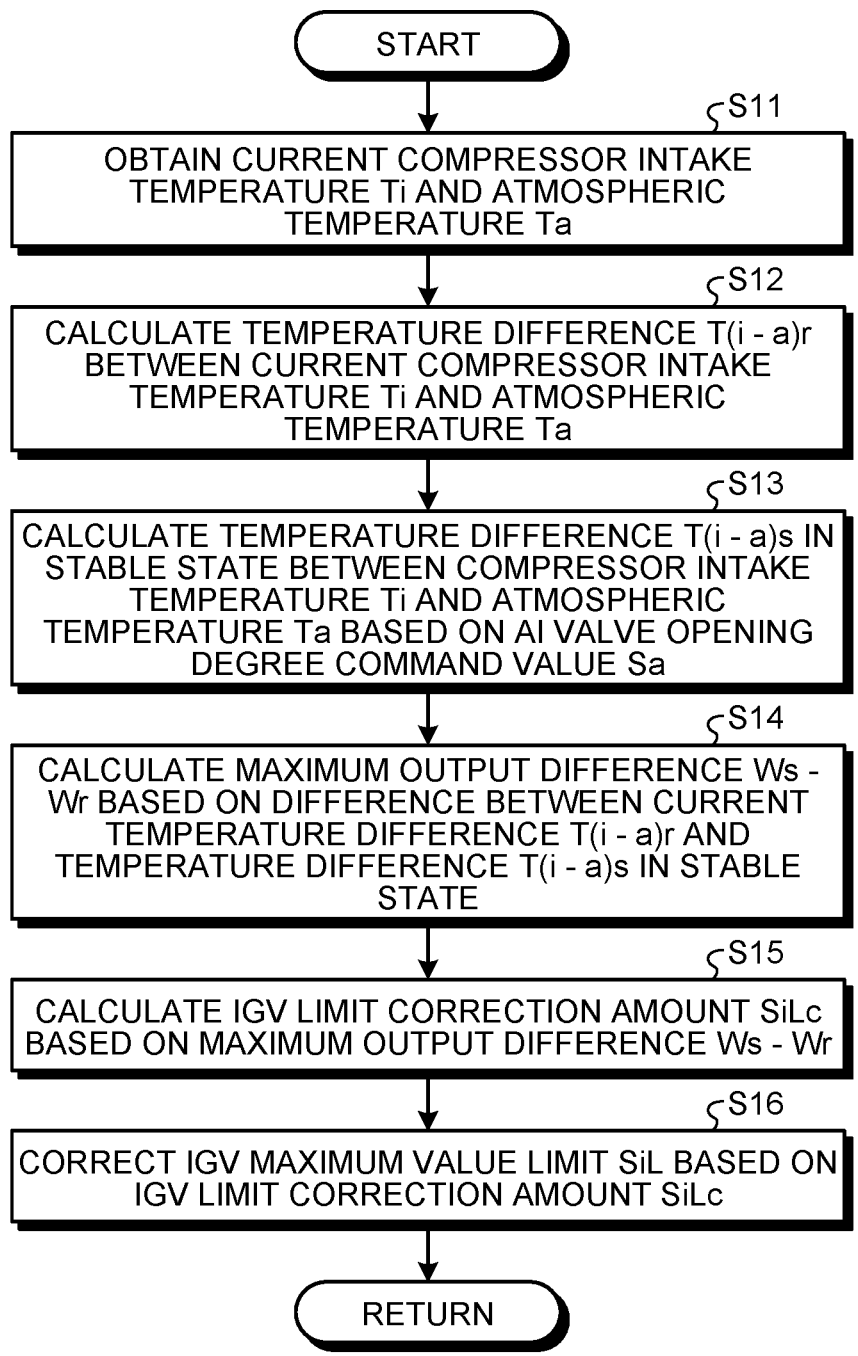
FIG. 7 is a flowchart illustrating the process of correcting the IGV maximum value limit performed by the controller for a gas turbine of the first embodiment.
Figure 8:
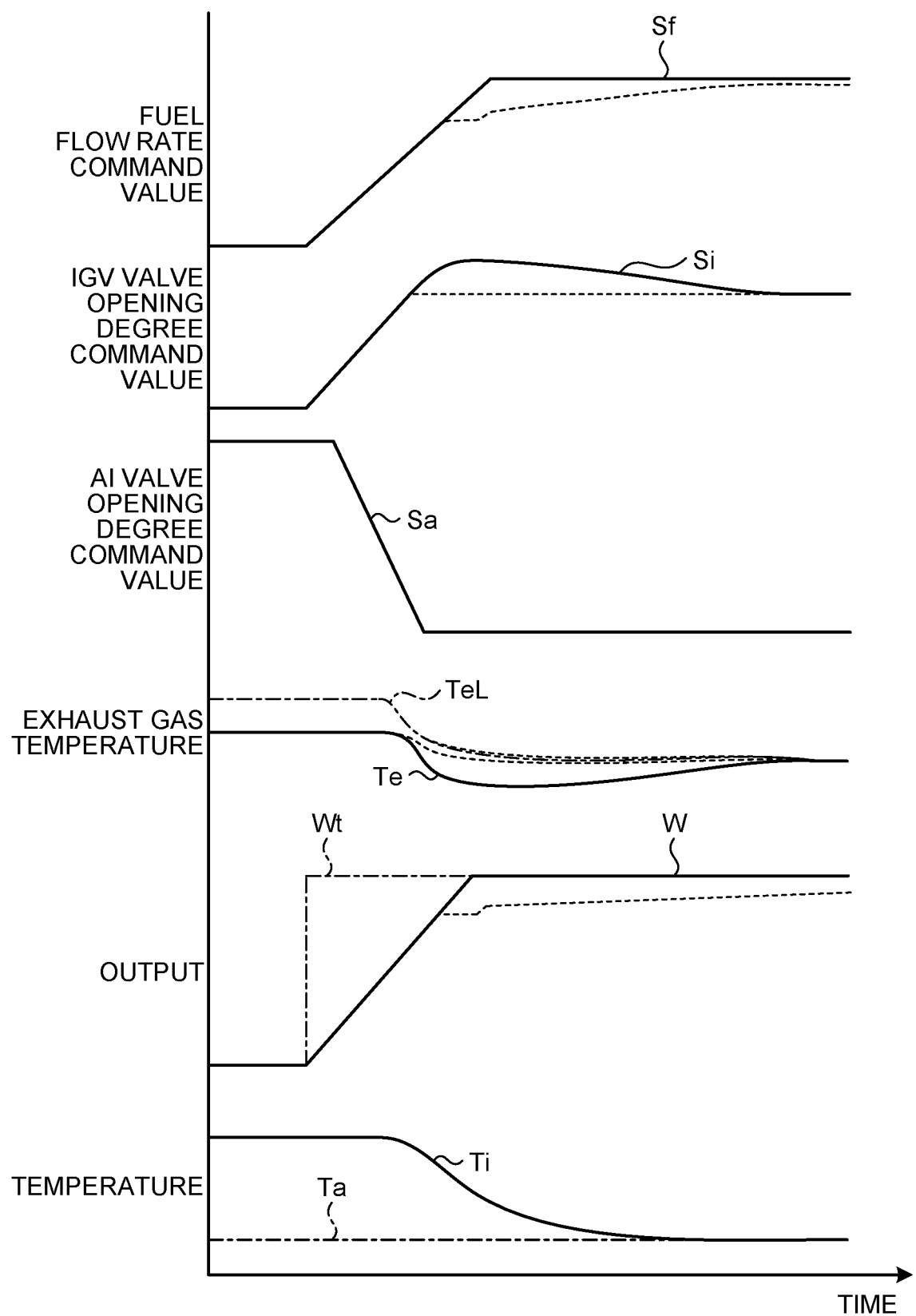
FIG. 8 is a graph illustrating fluctuations of pieces of data during the process of correcting the IGV maximum value limit performed by the controller for a gas turbine of the first embodiment.

The control in the process of correcting the IGV maximum value limit performed by the controller 14 is now described. FIG. 7 is a flowchart illustrating the process of correcting the IGV maximum value limit performed by the controller for a gas turbine of the first embodiment. FIG. 8 is a graph illustrating fluctuations of pieces of data during the process of correcting the IGV maximum value limit performed by the controller for a gas turbine of the first embodiment.

Referring to FIGS. 1 and 7, at step S11, the controller 14 obtains the current compressor intake temperature Ti and the atmospheric temperature Ta from the temperature sensors 37 and 38. At step S12, the controller 14 calculates the temperature difference $T(i-a)r$ between the current compressor intake temperature Ti and the atmospheric temperature Ta. At step S13, the controller 14 calculates the temperature difference $T(i-a)s$ in a steady state between the compressor intake temperature Ti and the atmospheric temperature Ta based on the AI valve opening degree command value Sa of the AI temperature regulating valve 34 (the correlation table 51).

At step S14, the controller 14 calculates the maximum output difference $Ws-Wr$ between the current maximum output Wr and the maximum output Ws in a steady state of the gas turbine 10, based on the temperature difference $T(i-a)r-T(i-a)s$ between the current temperature difference $T(i-a)r$ and the temperature difference $T(i-a)s$ in a steady state (the computing unit 52 and the correlation table 53). At step S15, the controller 14 calculates the IGV limit correction amount SiLc based on the maximum output difference $Ws-Wr$ (the correlation table 54). At step S15, the controller 14 corrects the IGV maximum value limit SiL by adding the IGV limit correction amount SiLc to the IGV maximum value limit SiL of the inlet guide vane 25 (the computing unit 55).

Referring to FIGS. 1 and 8, based on the target output Wt, the controller 14 controls the opening degrees of the pressure regulating valves 27, 29, and 31 and the flow rate regulating valves 28, 30, and 32 to regulate the fuel flow rate supplied to the combustor 12, and also controls the opening degree of the inlet guide vane 25 to regulate the air flow rate taken into the compressor 11. To increase the output of the gas turbine 10 to the rated load in the high-load region, the controller 14 increases the fuel flow rate (fuel flow rate command value Sf) and also increases the air flow rate (IGV valve opening degree command value Si). On the other hand, since the compressor intake temperature Ti rises, the flow rate regulating valve 35 is fully closed, and the bleed air flow rate (AI valve opening degree command value Sa) is reduced.

With the conventional control represented by the dotted lines in FIG. 8, the opening degree of the inlet guide vane 25 (IGV valve opening degree command value Si) cannot be increased because the IGV maximum value limit SiL of the inlet guide vane 25 is set to a predetermined value, and therefore the exhaust gas temperature Te is close to the exhaust gas limit temperature TeL. Consequently, the fuel flow rate (fuel flow rate command value Sf) cannot be increased until the compressor intake temperature Ti decreases, and a certain time is required for the output W to reach the target output Wt.

In contrast, the control of the first embodiment, which is indicated by the solid lines in FIG. 8, corrects and increases the IGV maximum value limit SiL of the inlet guide vane 25, so that the opening degree of the inlet guide vane 25 (IGV valve opening degree command value Si) can be increased. Accordingly, the exhaust gas limit temperature TeL slightly decreases, and the exhaust gas temperature Te decreases to a temperature that deviates from the exhaust gas limit temperature TeL. Accordingly, the fuel flow rate (fuel flow rate command value Sf) can be increased, enabling the output W to reach the target output Wt quickly at the load change rate.

Second Embodiment

Figure 9:
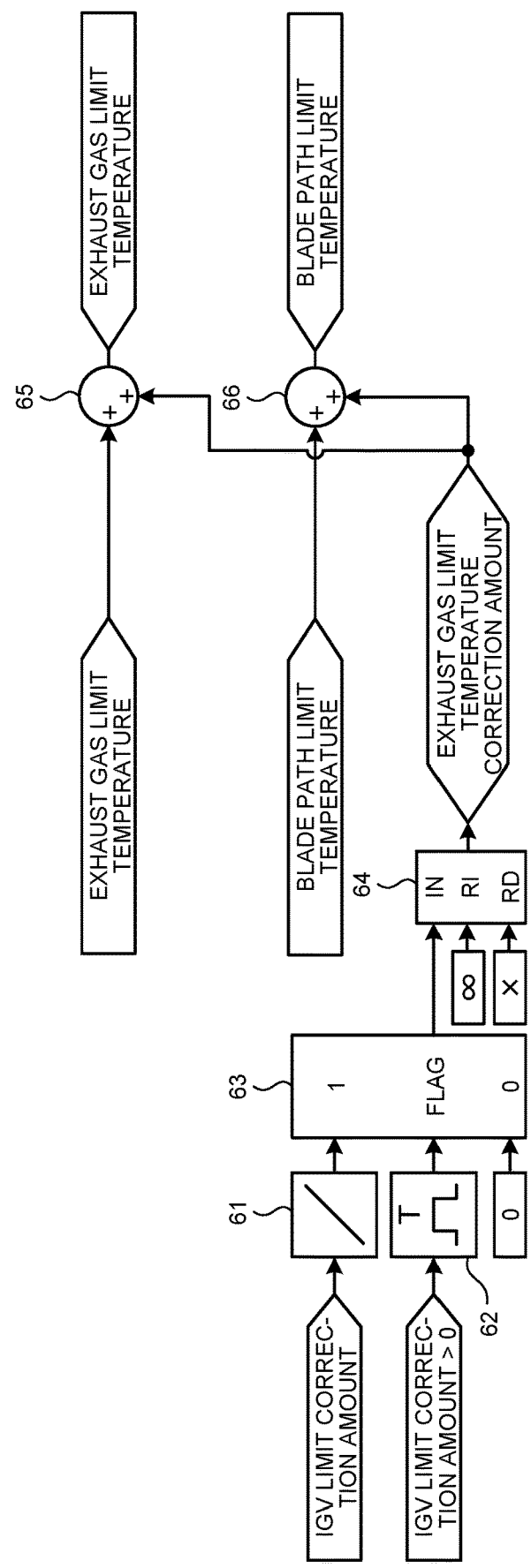
FIG. 9 is a schematic view illustrating the flow of the process of correcting the exhaust gas and blade path limit temperatures performed by a controller for a gas turbine of a second embodiment.
Figure 10:
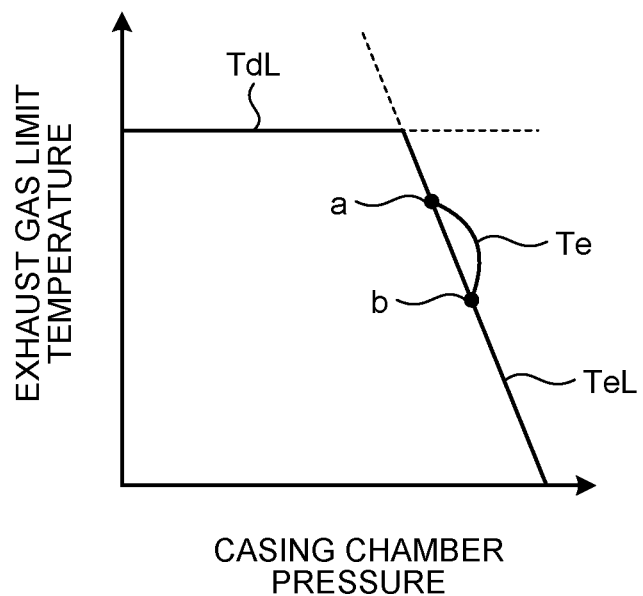
FIG. 10 is a graph illustrating the exhaust gas limit temperature with respect to the casing chamber pressure.
Figure 11:
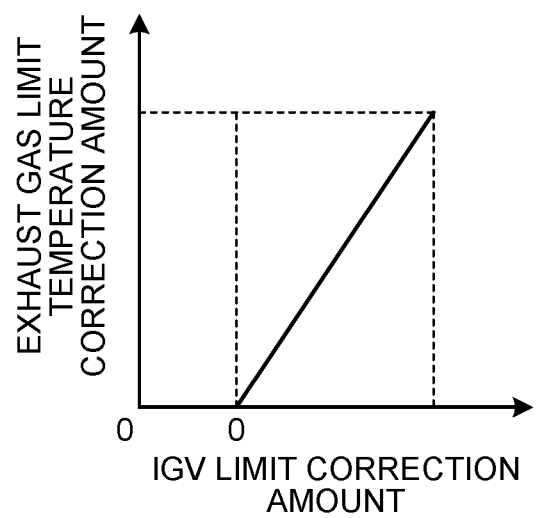
FIG. 11 is a graph illustrating the exhaust gas limit temperature correction amount with respect to the IGV limit correction amount.

FIG. 9 is a schematic view illustrating the flow of the process of correcting the exhaust gas and blade path limit temperatures performed by a controller for a gas turbine of a second embodiment. FIG. 10 is a graph illustrating the exhaust gas limit temperature with respect to the casing chamber pressure. FIG. 11 is a graph illustrating the exhaust gas limit temperature correction amount with respect to the IGV limit correction amount. The basic configuration of the second embodiment is the same as that of the first embodiment described above. The same reference numerals are given to the members with the same functions as in the first embodiment, and the detailed descriptions thereof are omitted.

The control of the first embodiment corrects and increases the IGV maximum value limit SiL of the inlet guide vane 25 based on the AI valve opening degree command value Sa of the AI temperature regulating valve 34, which is reduced in the opening degree, and the compressor intake temperature Ti, when the output of the gas turbine 10 increases in the high-load region. The opening degree of the inlet guide vane 25 (IGV valve opening degree command value Si) is thus increased, allowing the output W to increase without being limited by the exhaust gas limit temperature TeL. However, when the opening degree of the inlet guide vane 25 (IGV valve opening degree command value Si) is increased, the amount of incoming air increases relative to the amount of air being discharged from the compressor 11, thereby increasing the pressure of the compressor casing chamber and lowering the exhaust gas limit temperature TeL. The temperature transfer lag occurring in this process causes the exhaust gas temperature Te to be limited by the exhaust gas limit temperature TeL. This makes it difficult to increase the output W at the specified load change rate.

For this reason, the controller for a gas turbine of the second embodiment temporarily corrects and increases also the exhaust gas limit temperature TeL when correcting and increasing the IGV maximum value limit SiL in the high-load region of the gas turbine 10. This allows the output W to increase at the specified load change rate.

Referring to FIGS. 1 and 9, in the second embodiment, the controller 14 corrects the preset exhaust gas limit temperature TeL based on the amount of decrease in the exhaust gas limit temperature TeL of the turbine 13 corresponding to the IGV limit correction amount SiLc such that the gas turbine 10 achieves the predetermined performance. Specifically, the exhaust gas limit temperature TeL and the blade path limit temperature TeL1 of the turbine 13 are set based on the casing chamber pressure of the compressor 11 and the like. A correlation table 61 is used to calculate an exhaust gas limit temperature correction amount TeLc (or a blade path limit temperature correction amount TeL1c) according to the IGV limit correction amount SiLc.

That is, as illustrated in FIG. 10, the exhaust gas limit temperature TeL (blade path limit temperature TeL1), which includes an exhaust air duct temperature limit TdL and a turbine inlet temperature limit TtL, is set with respect to the casing chamber pressure. The exhaust air duct temperature limit TdL is constant relative to an increase in the casing chamber pressure, whereas the turbine inlet temperature limit TtL decreases with an increase in the casing chamber pressure. When the relation between the casing chamber pressure and the exhaust gas limit temperature TeL shifts from point a to point b, that is, when the casing chamber pressure increases, the exhaust gas limit temperature TeL (turbine inlet temperature limit TtL) decreases, but the actual exhaust gas temperature Te exceeds the exhaust gas limit temperature TeL due to the temperature transfer lag. As a result, the output W cannot be increased at the specified load change rate.

For this reason, using the correlation table 61, the amount of decrease in the exhaust gas limit temperature TeL of the turbine 13, that is, the exhaust gas limit temperature correction amount TeLc, is calculated based on the IGV limit correction amount SiLc. That is, as illustrated in FIG. 11, the correlation table 61 is an increasing function that takes the IGV limit correction amount SiLc as input and produces the exhaust gas limit temperature correction amount (the amount of decrease in the exhaust gas limit temperature TeL) TeLc as output. Here, the exhaust gas limit temperature correction amount (the amount of decrease in the exhaust gas limit temperature TeL) TeLc is output only when the IGV limit correction amount SiLc is greater than 0.

Referring to FIGS. 1 and 9, a computing unit 62 calculates a period P during which the exhaust gas limit temperature TeL is corrected based on the IGV limit correction amount SiLc. The computing unit 62 is a time delay wipeout element and outputs valid (1) instead of invalid (0) only during the period P when the IGV limit correction amount SiLc is greater than 0. The period P is set to compensate for the temperature response delay, that is, a time (e.g., 30 seconds to 1 minute) that makes up the temperature delay (the delay in the actual temperature and the instrument delay), for avoiding the temperature exceeding the exhaust gas limit temperature Te. When valid (1) is input from the computing unit 62, a switch 63 outputs the exhaust gas limit temperature correction amount TeLc output from the correlation table 61 only during the period P. A rate limiter 64 outputs a value obtained by multiplying the exhaust gas limit temperature correction amount TeLc by the rate. When the exhaust gas limit temperature correction amount TeLc is increased, the rate limiter 64 outputs a value obtained by multiplying the exhaust gas limit temperature correction amount TeLc by infinity ∞, that is, the exhaust gas limit temperature correction amount TeLc is output as it is. When the exhaust gas limit temperature correction amount TeLc is reduced, the rate limiter 64 outputs a value obtained by multiplying the exhaust gas limit temperature correction amount TeLc by a predetermined rate R (reduction rate: 0<R<1). That is, when the exhaust gas limit temperature correction amount TeLc becomes 0, instead of instantaneously outputting 0, the rate limiter 64 outputs the exhaust gas limit temperature correction amount TeLc while gradually reducing it to 0.

A computing unit 65 corrects the exhaust gas limit temperature TeL by adding the exhaust gas limit temperature correction amount TeLc to the exhaust gas limit temperature TeL. A computing unit 66 corrects the blade path limit temperature TeL1 by adding the exhaust gas limit temperature correction amount TeLc to the blade path limit temperature TeL1.

The control in the process of correcting the exhaust gas limit temperature performed by the controller 14 is now described. FIG. 12 is a flowchart of the process of correcting exhaust gas and blade path limit temperatures performed by the controller for a gas turbine of the second embodiment. FIG. 13 is a graph illustrating fluctuations of pieces of data during the process of correcting exhaust gas and blade path limit temperatures performed by the controller for a gas turbine of the second embodiment.

Referring to FIGS. 1 and 12, at step S21, the controller 14 obtains the IGV limit correction amount SiLc. At step S22, the controller 14 calculates the amount of decrease in the exhaust gas limit temperature TeL based on the IGV limit correction amount SiLc. At step S23, the controller 14 sets the period P during which the exhaust gas limit temperature TeL is valid based on the IGV limit correction amount SiLc. At step S24, the controller 14 outputs the amount of decrease in the exhaust gas limit temperature TeL only during the period P.

At step S25, the controller 14 determines whether the amount of decrease in the exhaust gas limit temperature TeL is increasing. If the amount of decrease in the exhaust gas limit temperature TeL is determined to be increasing (YES), the process proceeds to step S27. That is, when the exhaust gas limit temperature correction amount TeLc is increased, the amount of decrease in the exhaust gas limit temperature TeL is output as it is. If the amount of decrease in the exhaust gas limit temperature TeL is determined to be decreasing (NO), the process proceeds to step S26. At step S26, when the exhaust gas limit temperature correction amount TeLc is reduced, the amount of decrease in the exhaust gas limit temperature TeL is output at the predetermined rate R.

At step S27, the controller 14 sets the amount of decrease in the exhaust gas limit temperature TeL or the amount of decrease in the exhaust gas limit temperature TeL that is multiplied by the rate R as the exhaust gas limit temperature correction amount TeLc, and corrects the exhaust gas limit temperature TeL by adding exhaust gas limit temperature correction amount TeLc to the exhaust gas limit temperature TeL. At step S28, the controller 14 corrects the blade path limit temperature TeL1 by adding the exhaust gas limit temperature correction amount TeLc to the blade path limit temperature TeL1.

Referring to FIGS. 1 and 13, based on the target output Wt, the controller 14 controls the opening degrees of the pressure regulating valves 27, 29, and 31 and the flow rate regulating valves 28, 30, and 32 to regulate the flow rate of fuel supplied to the combustor 12, and also controls the opening degree of the inlet guide vane 25 to regulate the flow rate of air taken into the compressor 11. When the output of the gas turbine 10 is increased to the rated load in the high-load region, the controller 14 increases the fuel flow rate (fuel flow rate command value Sf) and also increases the air flow rate (IGV valve opening degree command value Si). On the other hand, since the compressor intake temperature Ti rises, the flow rate regulating valve 35 is fully closed, and the bleed air flow rate (AI valve opening degree command value Sa) is reduced.

At this time, with the control of the first embodiment indicated by the dotted lines in FIG. 13, the increased IGV opening degree based on the IGV limit correction amount TiLC reduces the exhaust gas limit temperature TeL and the blade path limit temperature TeL1, as well as the exhaust gas temperature Te and the blade path temperature Tel. Consequently, the exhaust gas temperature Te is close to the exhaust gas limit temperature TeL, and the blade path temperature Tel is close to the blade path limit temperature TeL1. Thus, the exhaust gas limit temperature TeL and the blade path limit temperature TeL1 limit the exhaust gas temperature Te and the blade path temperature Tel. This makes it difficult to increase the output W at the specified load change rate.

In contrast, the control of the second embodiment, which is indicated by the solid lines in FIG. 13, corrects and increases the IGV maximum value limit SiL of the inlet guide vane 25, so that the opening degree of the inlet guide vane 25 (IGV valve opening degree command value Si) can be increased. This suppresses a reduction in the exhaust gas limit temperature TeL, allowing the exhaust gas temperature Te to decrease to a temperature that deviates from the exhaust gas limit temperature TeL. The control also suppresses a reduction in the blade path limit temperature TeL1, allowing the blade path temperature Tel to decrease to a temperature that deviates from the blade path limit temperature TeL1. Accordingly, the fuel flow rate (fuel flow rate command value Sf) can be increased, enabling the output W to reach the target output Wt quickly at the load change rate.

Operation and Advantageous Effect of Embodiments

In a controller for a gas turbine according to a first aspect, a gas turbine 10 includes: a compressor 11 configured to compress air A; a combustor 12 configured to mix and combust fuel F and compressed air CA compressed by the compressor 11; a turbine 13 configured to obtain rotational power using combustion gas CG generated by the combustor 12; an inlet guide vane 25 disposed at an intake of the compressor 11 to adjust the flow rate of air flowing into the compressor 11; a bleed line L4 configured to return a part of the compressed air CA pressurized in the compressor 11 to the intake of the compressor 11; and an AI temperature regulating valve (on-off valve) 34 disposed in the bleed line L4. The controller is configured to, when the output of the gas turbine 10 increases, correct a preset IGV maximum value limit TiL of the inlet guide vane 25 based on an AI valve opening degree command value of the AI temperature regulating valve and a compressor intake temperature Ti such that the gas turbine 10 achieves a predetermined performance.

The controller for a gas turbine according to the first aspect is configured to, when the output of the gas turbine 10 increases, correct and increase the IGV maximum value limit TiL of the inlet guide vane 25 based on the AI valve opening degree command value of the AI temperature regulating valve and the compressor intake temperature Ti. This allows the opening degree of the inlet guide vane 25 (the IGV valve opening degree command value Si) to be increased, enabling the exhaust gas temperature Te to decrease relative to the exhaust gas limit temperature TeL. Consequently, an output W can reach a target output Wt according to the load change rate by increasing the fuel flow rate (fuel flow rate command value Sf). As a result, the power generation efficiency can be improved by shortening the time required for the output of the gas turbine 10 to increase to the rated output.

The controller for a gas turbine according to a second aspect is configured to correct the IGV maximum value limit TiL based on a temperature difference $T(i-a)r-T(i-a)s$ between a current compressor intake temperature Ti and a compressor intake temperature Ti in a steady state corresponding to an AI valve opening degree command value Sa of the AI temperature regulating valve 34. As such, the IGV maximum value limit TiL is corrected based on the temperature difference $T(i-a)r-T(i-a)s$ between the current compressor intake temperature Ti and that in a steady state. This allows the IGV maximum value limit TiL to be corrected with high accuracy.

The controller for a gas turbine according to a third aspect is configured to calculate a maximum output difference Ws−Wr between a current maximum output Wr and a maximum output Ws in a steady state based on the temperature difference, and correct the IGV maximum value limit TiL based on the maximum output difference Ws−Wr. As such, the IGV maximum value limit TiL is corrected based on the maximum output difference Ws−Wr between the current state and a steady state. This allows the IGV maximum value limit TiL to be corrected with high accuracy.

The controller for a gas turbine according to a fourth aspect is configured to calculate an IGV limit correction amount TiLc of the inlet guide vane 25 based on the AI valve opening degree command value Sa of the AI temperature regulating valve 34 and the compressor intake temperature Ti, and correct the IGV maximum value limit SiL by adding the IGV limit correction amount TiLc to the IGV maximum value limit TiL. The IGV limit correction amount TiLc is thus easily corrected and increased.

The controller for a gas turbine according to a fifth aspect is configured to correct an exhaust gas limit temperature TeL based on the amount of decrease in the exhaust gas limit temperature TeL of the turbine 13 corresponding to the IGV limit correction amount TiLc. When the opening degree of the inlet guide vane 25 (the IGV valve opening degree command value Si) increases, the casing chamber pressure increases, causing the exhaust gas limit temperature TeL to decrease. The fifth aspect allows the output W of the gas turbine 10 to reach the target output Wt according to the load change rate by correcting and increasing the exhaust gas limit temperature TeL based on the amount of decrease.

The controller for a gas turbine according to a sixth aspect is configured to set a period P during which the exhaust gas limit temperature TeL is corrected based on the IGV limit correction amount TiLc. This allows the exhaust gas limit temperature TeL to be corrected and increased only when necessary.

The controller for a gas turbine according to a seventh aspect is configured to calculate the exhaust gas limit temperature correction amount TeLc based on the amount of decrease in the exhaust gas limit temperature TeL corresponding to the IGV limit correction amount TiLc and correct the exhaust gas limit temperature TeL by adding the exhaust gas limit temperature correction amount TeLc to the exhaust gas limit temperature TeL. The exhaust gas limit temperature TeL can thus be easily corrected and increased.

The controller for a gas turbine according to an eighth aspect is configured to, when the exhaust gas limit temperature correction amount TeLc is reduced, reduce the exhaust gas limit temperature correction amount TeLc by a preset rate (reduction rate) R. As a result, when the exhaust gas limit temperature correction amount TeLc becomes 0, the amount is gradually reduced to 0, so that the effect of correcting the exhaust gas limit temperature TeL can be prevented from being instantly lost.

A method for controlling a gas turbine according to a ninth aspect corrects, when the output of the gas turbine 10 increases, a preset IGV maximum value limit TiL of the inlet guide vane 25 based on an AI valve opening degree command value of the AI temperature regulating valve and the compressor intake temperature Ti such that the gas turbine 10 achieves a predetermined performance. This allows the opening degree of the inlet guide vane 25 (IGV valve opening degree command value Si) to be increased, enabling an exhaust gas temperature Te to decrease relative to the exhaust gas limit temperature TeL. Consequently, the output W can reach the target output Wt according to the load change rate by increasing the fuel flow rate (fuel flow rate command value Sf). As a result, the power generation efficiency can be improved by shortening the time required for the output of the gas turbine 10 to increase to the rated output.

A gas turbine according to a tenth aspect includes the compressor 11 configured to compress the air A; the combustor 12 configured to mix and combust the fuel F and the compressed air CA compressed by the compressor 11; the turbine 13 configured to obtain rotational power using the combustion gas CG generated by the combustor 12; the inlet guide vane 25 disposed at the intake of the compressor 11 to adjust a flow rate of air flowing into the compressor 11; the bleed line L4 configured to return a part of the compressed air CA pressurized in the compressor 11 to the intake of the compressor 11; the AI temperature regulating valve (on-off valve) 34 disposed in the bleed line L4; and the controller 14 configured to control the inlet guide vane 25 and the AI temperature regulating valve 34. Consequently, the power generation efficiency can be improved by shortening the time required for the output of the gas turbine 10 to increase to the rated output.

In the embodiments described above, the maximum output difference Ws−Wr is calculated based on the temperature difference T(i−a)r−T(i−a)s between the temperature difference T(i−a)r between the current compressor intake temperature Ti and the atmospheric temperature Ta and the temperature difference T(i−a)s in a steady state between the compressor intake temperature Ti and the atmospheric temperature Ta. However, the present disclosure is not limited to this method. For example, the maximum output difference Ws−Wr may be calculated based on the temperature difference Tir−Tis between the current compressor intake temperature Ti and the compressor intake temperature Ti in a steady state.

REFERENCE SIGNS LIST

10 Gas turbine
11 Compressor
12 Combustor
13 Turbine
14 Controller
21 Rotation shaft
22 Generator
23 Duct
24 Air intake
25 Inlet guide vane
26 IGV drive portion
27, 29, 31 Pressure regulating valve
28, 30, 32 Flow rate regulating valve
33 AI supply valve
34 AI temperature regulating valve (on-off valve)
35 Flow rate regulating valve
36 TCA cooler
37, 38, 40, 41 Temperature sensor
39 Generator output detector
51, 53, 54 Correlation table
52, 55 Computing unit
61 Correlation table
62, 65, 66 Computing unit
63 Switch
64 Rate limiter
A Air
CA Compressed air
CG Combustion gas
F Fuel
EG Exhaust gas
L1 Main fuel supply line
L2 Pilot fuel supply line
L3 Top hat fuel supply line
L4 Bleed line
L5 Cooling line
P Period
Sf Fuel flow rate command value
Si IGV valve opening degree command value
SiL IGV maximum value limit
SiLc IGV limit correction amount
Sa AI valve opening degree command value
Ta Atmospheric temperature
Ti Compressor intake temperature
Te Exhaust gas temperature
TeL Exhaust gas limit temperature
TeLc Exhaust gas limit temperature correction amount
Tel Blade path temperature
TeL1 Blade path limit temperature W Output (load value)
Wt Target output (target load value)

The invention claimed is:

1. A controller for a gas turbine,
the gas turbine comprising:
  a compressor configured to compress air;
  a combustor configured to mix and combust fuel and the compressed air compressed by the compressor;
  a turbine configured to obtain rotational power using combustion gas generated by the combustor;
  an inlet guide vane disposed at an intake of the compressor to adjust a flow rate of the air flowing into the compressor;
  a bleed line configured to return a part of the compressed air pressurized in the compressor to the intake of the compressor; and
  an on-off valve disposed in the bleed line,
wherein the controller is configured to:
  when an output of the gas turbine increases, correct a preset maximum value limit of the inlet guide vane based on a valve opening degree command value of the on-off valve and a compressor intake temperature such that the gas turbine achieves a predetermined performance,
  correct the maximum value limit based on a current compressor intake temperature and a compressor intake temperature in a steady state that corresponds to the valve opening degree command value of the on-off valve, and
  calculate a maximum output difference between a current maximum output and a maximum output in the steady state based on the temperature difference and correct the maximum value limit based on the maximum output difference.

2. The controller for the gas turbine according to claim 1, wherein the controller is configured to calculate a limit correction amount of the inlet guide vane based on the valve opening degree command value of the on-off valve and the compressor intake temperature and correct the maximum value limit by adding the limit correction amount to the maximum value limit.

3. The controller for the gas turbine according to claim 2, wherein the controller is configured to correct a preset exhaust gas limit temperature of the turbine based on an amount of decrease in an exhaust gas limit temperature of the turbine corresponding to the limit correction amount.

4. The controller for the gas turbine according to claim 3, wherein the controller is configured to set a period in which the exhaust gas limit temperature is corrected based on the limit correction amount.

5. The controller for the gas turbine according to claim 3, wherein the controller is configured to calculate an exhaust gas limit temperature correction amount based on the amount of decrease in the exhaust gas limit temperature corresponding to the limit correction amount and correct the exhaust gas limit temperature by adding the exhaust gas limit temperature correction amount to the exhaust gas limit temperature.

6. The controller for the gas turbine according to claim 5, wherein the controller is configured to, when the exhaust gas limit temperature correction amount is reduced, reduce the exhaust gas limit temperature correction amount at a preset reduction rate.

7. A control method for a gas turbine,
the gas turbine comprising:
  a compressor configured to compress air;
  a combustor configured to mix and combust fuel and the compressed air compressed by the compressor;
  a turbine configured to obtain rotational power using combustion gas generated by the combustor;
  an inlet guide vane disposed at an intake of the compressor to adjust a flow rate of the air flowing into the compressor;
  a bleed line configured to return a part of the compressed air pressurized in the compressor to the intake of the compressor; and
  an on-off valve disposed in the bleed line,
the control method comprising:
  correcting, when an output of the gas turbine increases, a preset maximum value limit of the inlet guide vane based on a valve opening degree command value of the on-off valve and a compressor intake temperature such that the gas turbine achieves a predetermined performance;
  correcting the maximum value limit based on a current compressor intake temperature and a compressor intake temperature in a steady state that corresponds to the valve opening degree command value of the on-off valve, and
  calculating a maximum output difference between a current maximum output and a maximum output in the steady state based on the temperature difference and correct the maximum value limit based on the maximum output difference.

8. A gas turbine comprising:
a compressor configured to compress air;
a combustor configured to mix and combust fuel and the compressed air compressed by the compressor;
a turbine configured to obtain rotational power using combustion gas generated by the combustor;
an inlet guide vane disposed at an intake of the compressor to adjust a flow rate of the air flowing into the compressor;
a bleed line configured to return a part of the compressed air pressurized in the compressor to the intake of the compressor;
an on-off valve disposed in the bleed line; and
a controller configured to:
  when an output of the gas turbine increases, correct a preset maximum value limit of the inlet guide vane based on a valve opening degree command value of the on-off valve and a compressor intake temperature such that the gas turbine achieves a predetermined performance,
  correct the maximum value limit based on a current compressor intake temperature and a compressor intake temperature in a steady state that corresponds to the valve opening degree command value of the on-off valve, and
  calculate a maximum output difference between a current maximum output and a maximum output in the steady state based on the temperature difference and correct the maximum value limit based on the maximum output difference.

* * * * *